United States Patent
Pinard et al.

(10) Patent No.: US 6,675,194 B1
(45) Date of Patent: Jan. 6, 2004

(54) HANDLING DIFFERENT COMMUNICATIONS TYPES BY USING AGENTS TO IMPLEMENT COMMUNICATION GOAL COMMANDS

(75) Inventors: Deborah L. Pinard, Kanata (CA); Eliana M. O. Peres, Ottawa (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/305,873

(22) Filed: May 5, 1999

Related U.S. Application Data
(60) Provisional application No. 60/084,734, filed on May 8, 1998.

(30) Foreign Application Priority Data

May 5, 1998 (GB) ................................ 9809601

(51) Int. Cl.⁷ ................. H04L 12/66; H04M 11/00; G06F 15/16
(52) U.S. Cl. .................. 709/202; 709/204; 709/228; 370/352; 379/90.01; 379/93.01; 379/93.07; 379/93.09
(58) Field of Search ........................... 709/202, 204, 709/228, 200, 203; 379/90, 90.01, 93.01, 93.07, 93.09, 100.18, 100.12, 100.15; 370/352

(56) References Cited

U.S. PATENT DOCUMENTS

| | | | |
|---|---|---|---|
| 5,638,494 A | | 6/1997 | Pinard et al. |
| 5,790,789 A | * | 8/1998 | Suarez ......................... 709/202 |
| 5,850,517 A | * | 12/1998 | Verkler et al. ............... 709/203 |
| 5,953,332 A | * | 9/1999 | Miloslavsky ................ 370/352 |
| 6,016,478 A | * | 1/2000 | Zhang et al. ................... 705/9 |
| 6,044,368 A | * | 3/2000 | Powers ........................... 707/2 |
| 6,049,819 A | * | 4/2000 | Buckle et al. ............... 709/202 |
| 6,085,222 A | * | 7/2000 | Fujino et al. ................ 709/202 |
| 6,101,182 A | * | 8/2000 | Sistanizadeh et al. ........ 370/352 |
| 6,148,327 A | * | 11/2000 | Whitebread et al. ......... 709/202 |
| 6,185,288 B1 | * | 2/2001 | Wong ........................... 379/219 |
| 6,185,565 B1 | * | 2/2001 | Meubus et al. ................ 707/10 |
| 6,233,318 B1 | * | 5/2001 | Picard et al. ............. 379/88.17 |
| 6,233,601 B1 | * | 5/2001 | Walsh .......................... 709/202 |
| 6,243,396 B1 | * | 6/2001 | Somers ........................ 370/469 |
| 6,259,449 B1 | * | 7/2001 | Saxena et al. ............... 345/853 |
| 6,285,364 B1 | * | 9/2001 | Giordano et al. ............ 345/804 |
| 6,285,977 B1 | * | 9/2001 | Miyazaki ....................... 703/26 |
| 6,295,293 B1 | * | 9/2001 | Tonnby et al. ............... 370/389 |
| 6,334,139 B1 | * | 12/2001 | Sakakura ...................... 709/202 |
| 6,359,892 B1 | * | 3/2002 | Szlam .......................... 370/401 |
| 6,385,196 B1 | * | 5/2002 | Hayball et al. ............. 370/356 |
| 6,389,464 B1 | * | 5/2002 | Krishnamurthy et al. ... 709/220 |
| 6,424,872 B1 | * | 7/2002 | Glanzer et al. ............... 700/18 |
| 6,430,282 B1 | * | 8/2002 | Bannister et al. ....... 379/211.02 |
| 6,442,616 B1 | * | 8/2002 | Inoue et al. ................. 709/245 |

FOREIGN PATENT DOCUMENTS

| | | |
|---|---|---|
| GB | 2 289 598 | 3/1995 |
| GB | 2 311 188 | 2/1997 |
| GB | 2 328 831 | 8/1997 |

* cited by examiner

Primary Examiner—Robert B. Harrell
Assistant Examiner—Melvin H Pollack
(74) Attorney, Agent, or Firm—Fenwick & West LLP

(57) ABSTRACT

A communication system includes a plurality of desktop controller agents receiving goal commands and invoking a process to achieve the goals. A plurality of resource agents each in communication with an associate device receives and stores goals from a desktop controller agent and operates the associated device in response to goals received from the desktop controller agent. A network interconnects all of the agents and carries goals between the agents. Communications folders for the user agents are maintained and include a log of communications made using devices associated with a respective desktop controller agent. Attachments can be selected to accompany communications made using the devices.

43 Claims, 14 Drawing Sheets

LOG – list format

| Type | Time | Date | Direction | Author | Receiver | Duration | Etc |
|---|---|---|---|---|---|---|---|
| phone call | 09 : 32 | 2/10/96 | incoming | Joe | . | . | . |
| more msg | 10 : 15 | ⟶ | outgoing | Debbie | . | . | . |
| appointment | 10 : 45 | ⟶ | incoming | John | . | . | . |
| voice mail | 11 : 30 | ⟶ | incoming | Mary | . | . | . |
| fax msg | 01 : 22 | ⟶ | incoming | Ellen | . | . | . |
| video call | 02 : 01 | | outgoing | Debbie | . | . | . |
| file creation | 03 : 02 | | - | Debbie | | | |

FIG.4

Auto Report Application input parameters start – time / date   } special cases of these
        end – time / date    } would mean all report – type : complete, summary
        include – list : which types of logs start
open log
search for entries that are : in right time / date,
                                and
                       in include – list
store chronologically in temp–log
case report–type of summary :
        search for entries in temp–log with same
        author or receiver delete all but one ENCASE
open text file (notepad, word, etc.)
for each entry in temp–log Do
create a sentence (predefined) which uses the
log for the details.

end for
store text file
END

FIG.9

HANDLING DIFFERENT COMMUNICATIONS TYPES BY USING AGENTS TO IMPLEMENT COMMUNICATION GOAL COMMANDS

This application claims the benefit of provisional application No. 60/084,734 filed May 8, 1998.

FIELD OF THE INVENTION

The present invention relates to communications systems and in particular to a communications system and method which treats different types of communications in a similar manner and provide a uniform presentation for different types of communications. The present invention also relates to a communications system and method which provides local switching control of telephone interface circuits to network channels to avoid glare situations.

BACKGROUND OF THE INVENTION

Communications systems in the past have treated different types of communications differently. Specifically, telephone calls, electronic mail (e-mail), voice mail, facsimile messages and video calls have all been handled by these communications systems using separate applications. These separate applications typically have different functions and all work slightly different making applications integration difficult.

Communications systems having "universal in-boxes" to handle e-mail, voice mail and facsimile messages have also been considered. These communications systems are based on a client-server architecture with the server acting as the central processor and controlling data flow in the communications system. Telephone call control is also handled by the server. Although this type of communications system provides a "universal in-box", the different types of communications are still handled differently. Also, the centralized server to control communications can become a bottleneck in the communications system. In addition, in these communications systems, when one party wishes to place another party on hold, that party must signal the server to connect the other party's channel to silence and connect their channel to dial tone. If the party placed on hold is manipulating their channels, glare situations can arise. As should be appreciated by those of skill in the art, these communications systems constrain users to communicate in ways fixed by the communications system. Thus, users are required to adapt to the constraints of the communications system, rather than the communications system adapting to the needs of the users.

It is therefore an object of the present invention to provide a novel communications system and method which obviates and mitigates at least one of the above-described disadvantages.

SUMMARY OF THE INVENTION

According to one aspect of the present invention there is provided a method of operating a communications system comprising the steps of:

providing a plurality of desktop controller agents for receiving goal commands (goals) from agents and for invoking processes to achieve said goals;

providing a plurality of resource agents, each in communication with an associated device for receiving and storing goals from a desktop controller agent and for operating said associated device in response thereto;

interconnecting all of said agents and carrying goals between said agents;

maintaining communications folders for said agents, each said communications folder including a log of communications made using devices associated with a respective desktop controller agent; and selectively including attachments to accompany communications made using said devices.

Preferably, at least one communications folder is maintained for each agent representing a person or people with different roles. It is also preferred that the different types of communications includes voice calls, video calls, appointments, shared data calls, e-mails, voice mails and facsimile messages.

Preferably, each desktop controller agent is created by a user agent and has jurisdiction over a plurality of resource agents. Each of the resource agents receives and stores goals and operates an associated device to permit the different types of communications to occur between agents who have jurisdiction over desktop controller agents.

Preferably, each role agent stores the at least one communications folder for an associated user agent and creates entries for the logs as communications are made and received. It is also preferred that each role agent executes a script to create each log entry. It is also preferred that the logs can be sorted and configured to display entries in basically any convenient and desired manner. Preferably the desktop controller agents create operating system monitor agents to monitor the operating systems of computers so that the role agents can create logs of created files to allow files to be linked to entries in the communications logs.

According to another aspect of the present invention there is provided a communications system comprising:

a plurality of desktop controller agents for receiving goal commands (goals) and for invoking a process to achieve said goals;

a plurality of resource agents, each in communication with an associated device for receiving and storing goals from a desktop controller agent and for operating said associated device in response to receiving said goals from a desktop controller agent;

a network interconnecting all of said agents and carrying goals between said agents;

communications folders for said agents, each said communications folder including a log of communications made using devices associated with a respective desktop controller agent; and attachments to accompany selectively communications made using said devices.

According to still yet another aspect of the present invention there is provided a communications system comprising:

a plurality of process agents for receiving goal commands (goals) in the form of signals defining tasks to be performed to establish telephone calls;

a plurality of connection agents, each in communication with an associated telephone interface circuit for receiving and storing goals from a process agent and for operating said associated telephone interface circuit in response to receiving said goals from a process agent to establish a telephone call from one telephone interface circuit to another; and a network interconnecting all of said agents and carrying goals between said agents thereby, said connection agents locally controlling connection of said telephone interface circuits to channels of said network.

In still yet another aspect of the present invention there is provided a method of operating a communications system comprising the steps of:

providing a plurality of process agents for receiving goal commands (goals) in the form of signals defining tasks to be performed to establish telephone calls;

providing a plurality of connection agents, each in communication with an associated telephone interface circuit for receiving and storing goals from a process agent and for operating said associated telephone interface circuit in response to receiving said goals from a process agent to establish a telephone call from one telephone interface circuit to another;

interconnecting all of said agents and carrying goals between said agents; and locally controlling connection of said telephone interface circuits to channels of said network via said connection agents.

According to still yet another aspect of the present invention there is provided a communications system comprising:

a network having a plurality of channels;

a plurality of telephone devices connectable to one or more channels of said network to establish telephone connections between telephone devices; and switch means acting between each of said telephone devices and said network, each said switch means being locally controlled to connect said assciated telephone device to selected channels of said network.

According to still yet another aspect of the present invention there is provided a method of operating a communications system comprising the steps of:

providing a plurality of desktop controller agents for receiving goal commands (goals) from agents and for invoking processes to achieve said goals;

providing a plurality of resource agents, each in communication with an associated device for receiving and storing goals from a desktop controller agent and for operating said associated device in response thereto;

interconnecting all of said agents and carrying goals between said agents;

maintaining communications folders for said agents, each said communications folder including a log of communications made using devices associated with a respective desktop controller agent; and selectively executing routines to sort entries in said log thereby to generate reports.

According to still yet another aspect of the present invention there is provided a communications system comprising:

a plurality of desktop controller agents for receiving goal commands (goals) and for invoking a process to achieve said goals;

a plurality of resource agents, each in communication with an associated device for receiving and storing goals from a desktop controller agent and for operating said associated device in response to receiving said goals from a desktop controller agent;

a network interconnecting all of said agents and carrying goals between said agents;

communications folders for said agents, each said communications folder including a log of communications made using devices associated with a respective desktop controller agent; and selectable executable routines to sort entries in said log thereby to generate reports.

The present invention provides advantages in that since different types of communications are treated the same, similar services and features can be applied to different types of communications thereby facilitating applications integration. Also, by treating different types of communications the same, a uniform presentation can be used for all types of communications. In addition, since the communications system breaks the client-server mold and relies on peer to peer communications, connection control between parties is handled locally avoiding glare situations from occurring.

BRIEF DESCRIPTION OF THE DRAWINGS

An embodiment of the present invention will now be described more fully with reference to the accompanying drawings in which:

FIG. 4 is a log of communications sent and received by a user agent;

FIG. 9 is pseudo code representing an application to produce a monthly report or summary from the entries in the communications log of FIG. 4.

DETAILED DESCRIPTION OF THE PREFERRED EMBODIMENT

Figure 1:
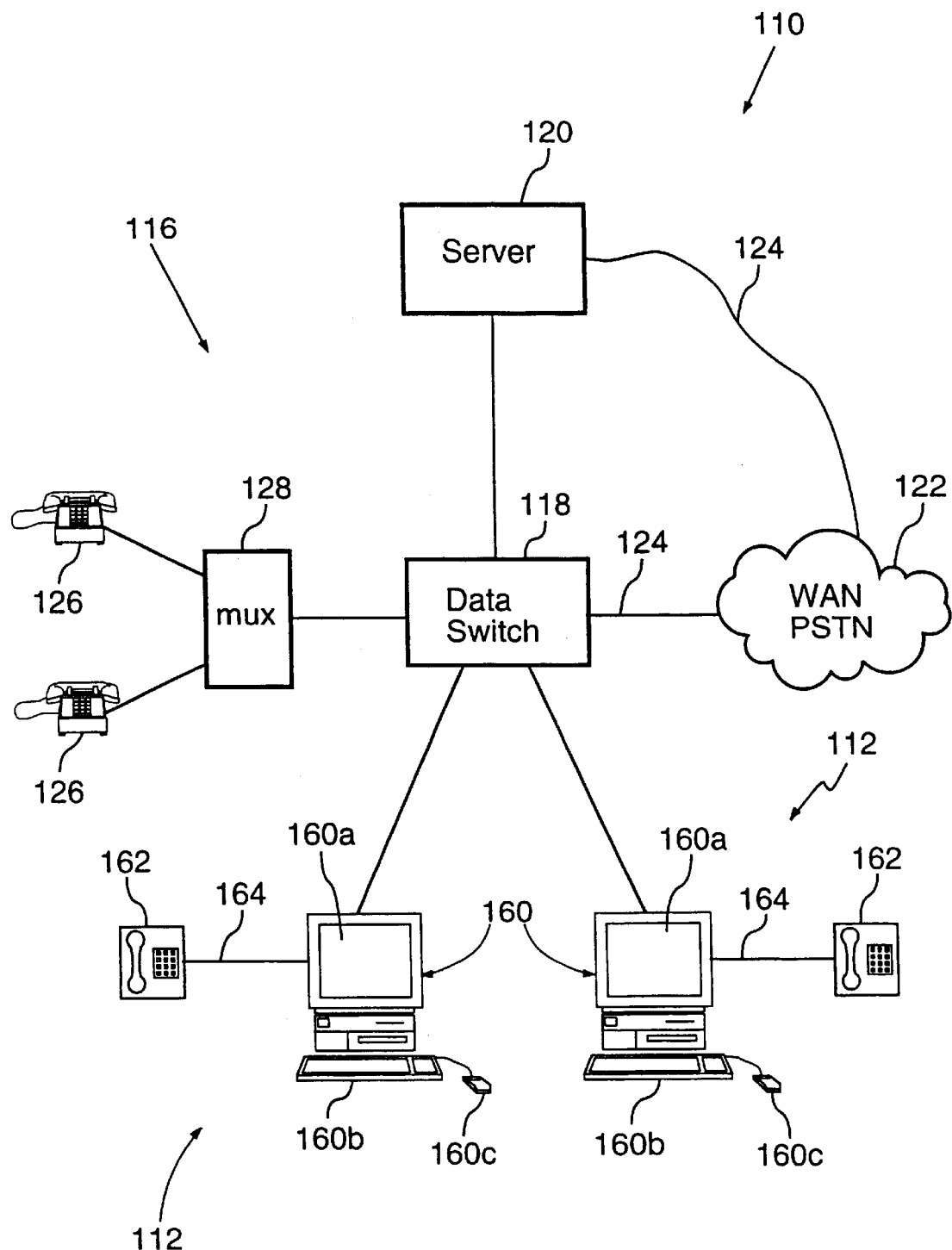
FIG. 1 is a schematic diagram of a communications system in accordance with the present invention.

Referring now to FIG. 1, a communications system 110 in accordance with the present invention is shown and includes a pair of processor systems 112 connected to a network 116. Network 116 includes a data switch 118 such as an ATM or Ethernet switch and a server 120. The data switch 118 and the server 120 are connected to a wide area network (WAN) or public switched telephone network (PSTN) 122 via T1 or ISDN data links 124. Stand alone telephones 126 are connected to the data switch 118 by way of a data multiplexer 128. The communications system 110 is based on the architecture described in U.S. Pat. No. 5,638,494 to Pinard et al. issued on Jun. 10, 1997 and in U.S. Pat. No. 5,657,446 to Pinard et al. issued on Aug. 12, 1997 assigned to Mitel Corporation, assignee of the present invention, the contents of which are incorporated herein by reference.

Figure 2A:
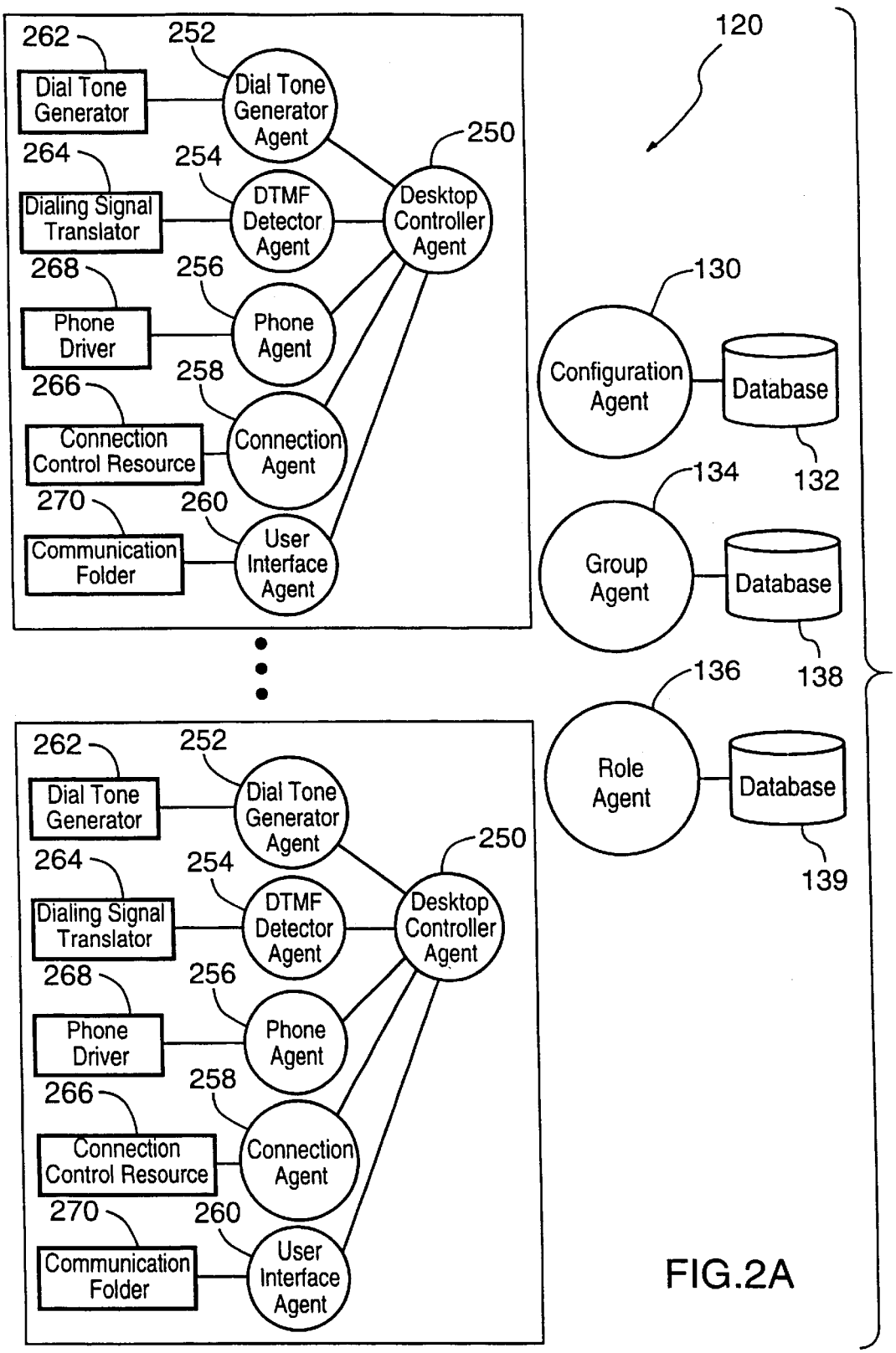
FIGS. 2A, 2B and 2C are schematic diagrams illustrating an agent layout for one of the processor systems forming part of the communications system of FIG. 1.

The server 120 (better shown in FIG. 2A) includes a configuration agent 130 which contains a computer program for configuring the various agents in the communications system 110 and their goals. A goal is a definition of the purpose of a particular function, for example the connection of a telephone with a virtual channel to allow a call to be established across the network 122. The configuration agent 130 is responsible for downloading goals stored in memory therein to the various agents at start up and as new agents, devices and goals are added, changed or removed from the communications system 110. The server 120 also includes a database 132 storing a directory of addresses for the various agents so that when a goal is to be accomplished, the addresses for the various agents may be obtained by the agent requiring the addresses.

Group agents and role agents 134 and 136 respectively are also resident in the server 120. The group and role agents are responsible for functions. The group agents include databases 138 for keeping policies and preferences relating to groups such as for example directories for people, timetables and any other preferences related to a group of people rather than a single role. The group agents 134 use the role agents 136 to perform their functions. FIG. 2C shows an agent which represents a person with different roles, referred to as a user agent 140. The role agents 136 include databases 139 storing communications information (se FIG. 3A) and the user agents 140 include databases 141 for storing policies and preferences relating to communications preferences such as for example, call screening, call forwarding etc. (see FIG. 3B).

Turning back to FIG. 1, it can be seen that each processor system 112 includes a personal computer (PC) 160 and a telephone 162 connected to the personal computer 160 by way of a universal serial bus (USB) 164. USB includes a 12 Mbit/s serial interface running over a 4 wire bus with an associated software stack supporting peripheral connectivity to the PC 160. The PC 160 includes a display or monitor 160a, a keyboard 160b and a mouse pointer 160c operating in a well known manner.

Within each PC 160 is a desktop controller agent 170 (see FIG. 2B) to handle a desktop related resources for a user agent 140. The desktop controller agent 170 is created by the user agent when a user logs into the network 116. The created desktop controller agent 170 selects resources which are necessary for the desktop controller agent to provide the user agent 140 with the communications resources it requires in order for the user agent to fulfill its role. The desktop controller agent 170 includes a call discriminator to discriminate between types of communications such as voice, facsimile or data being received and to invoke an application that can handle the communication if the communication is to be received. In this manner, the user agent 140 does not know or care about the resources available to the processor system 1 12.

Figure 2B:
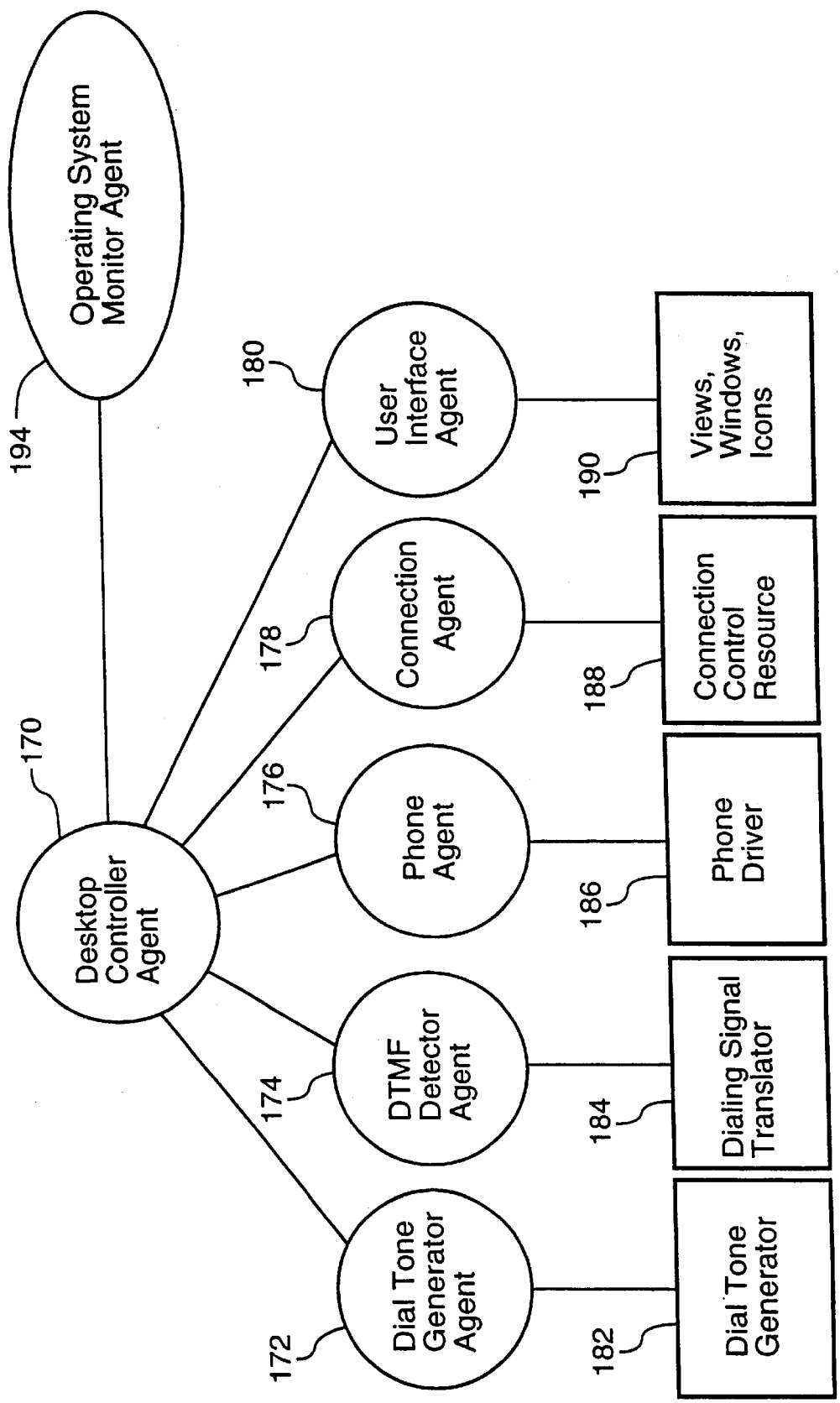
Figure 2C:
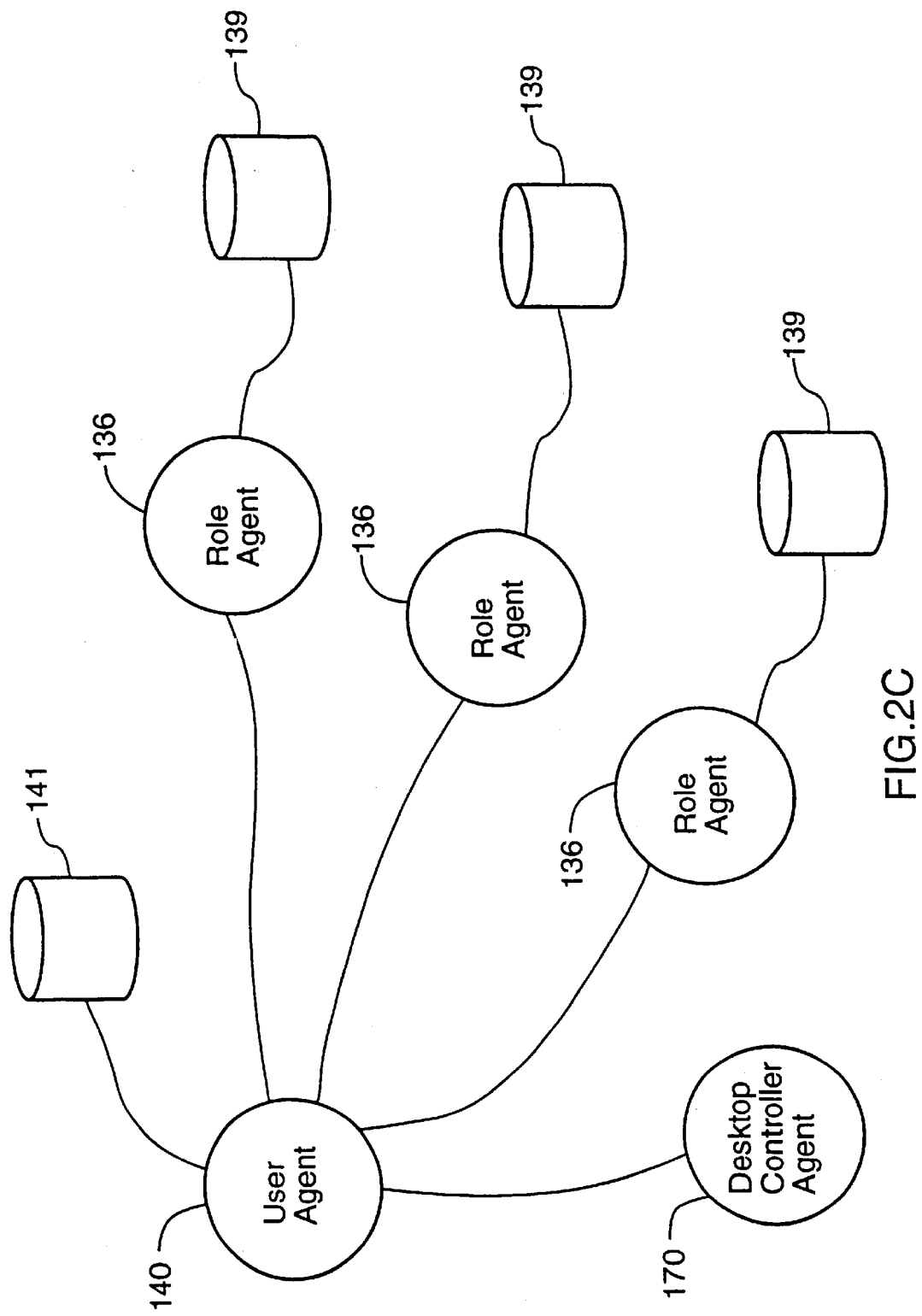

As is shown in FIG. 2B, the desktop controller agent 170 has jurisdiction over and is responsible for creating and initializing a dial tone generator agent 172, a dialing signal (digital multi-frequency (DTMF)) detector agent 174, a phone agent 176, a connection agent 178 and a user interface agent 180

The dial tone generator agent 172 is responsible for providing the telephone 162 with a dial tone by way of a dial tone generator 182 when an off-hook or "hands-free" dialing condition is detected. The dialing signal detector agent 174 is responsible for storing dialing signals generated by the telephone 162 and translated by a dialing signal translator 184. The phone agent 176 is connected to a phone driver 186 and executes a program loop for monitoring the telephone line current via the phone driver 186 so that off-hook and "hands-free" dialing conditions of the telephone 162 are detected. The connection agent 178 generates requests to a group agent 134 to establish a connection between the telephone 162 and virtual channels of the network 116. Connections between the telephone 162 and virtual channels of the network 116 are made by a connection control resource 188 when the request has been accepted.

Figure 8A:
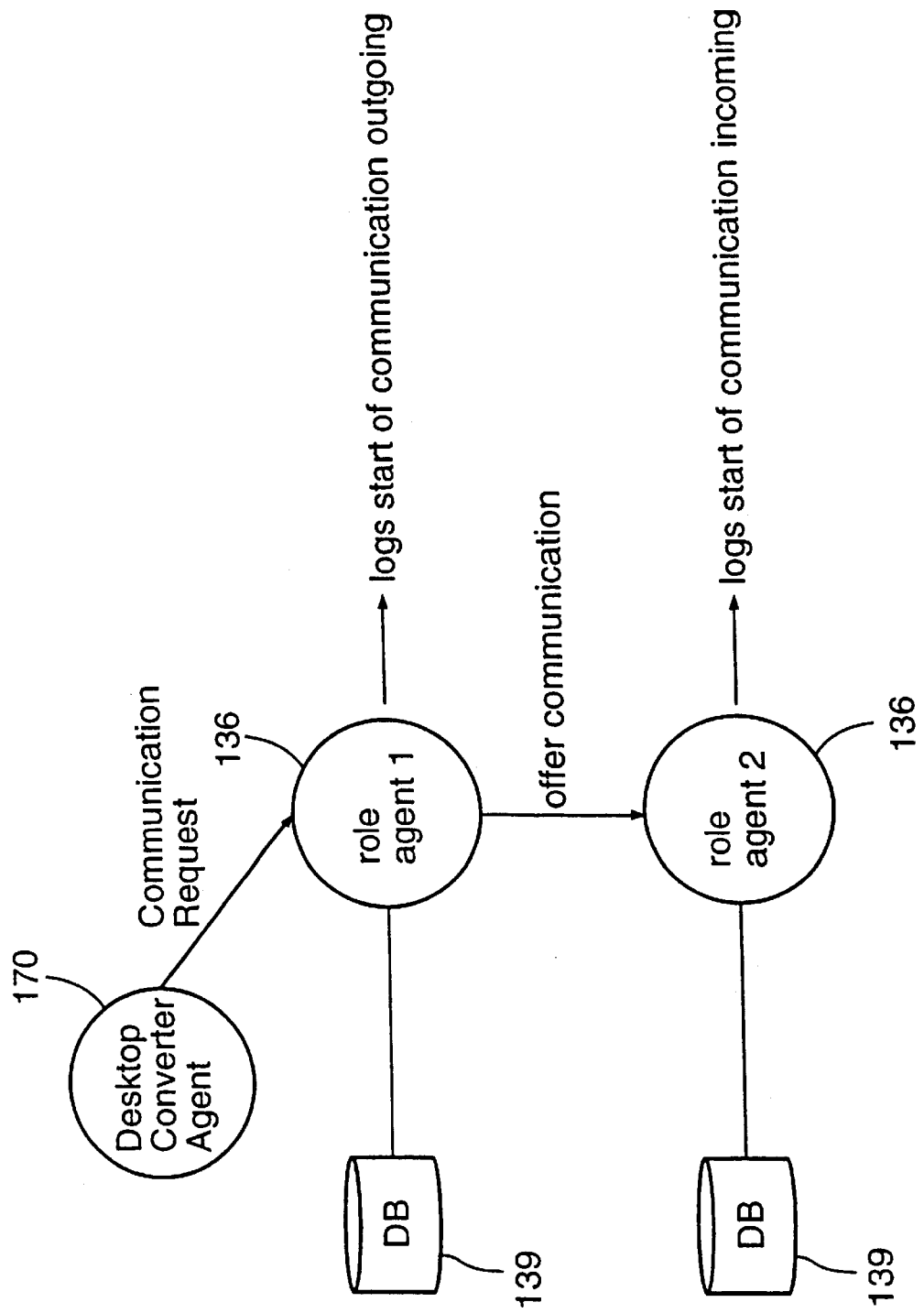
FIGS. 8A and 8B are schematic diagrams illustrating the process by which entries are made in the communications log of FIG. 4.
Figure 8B:
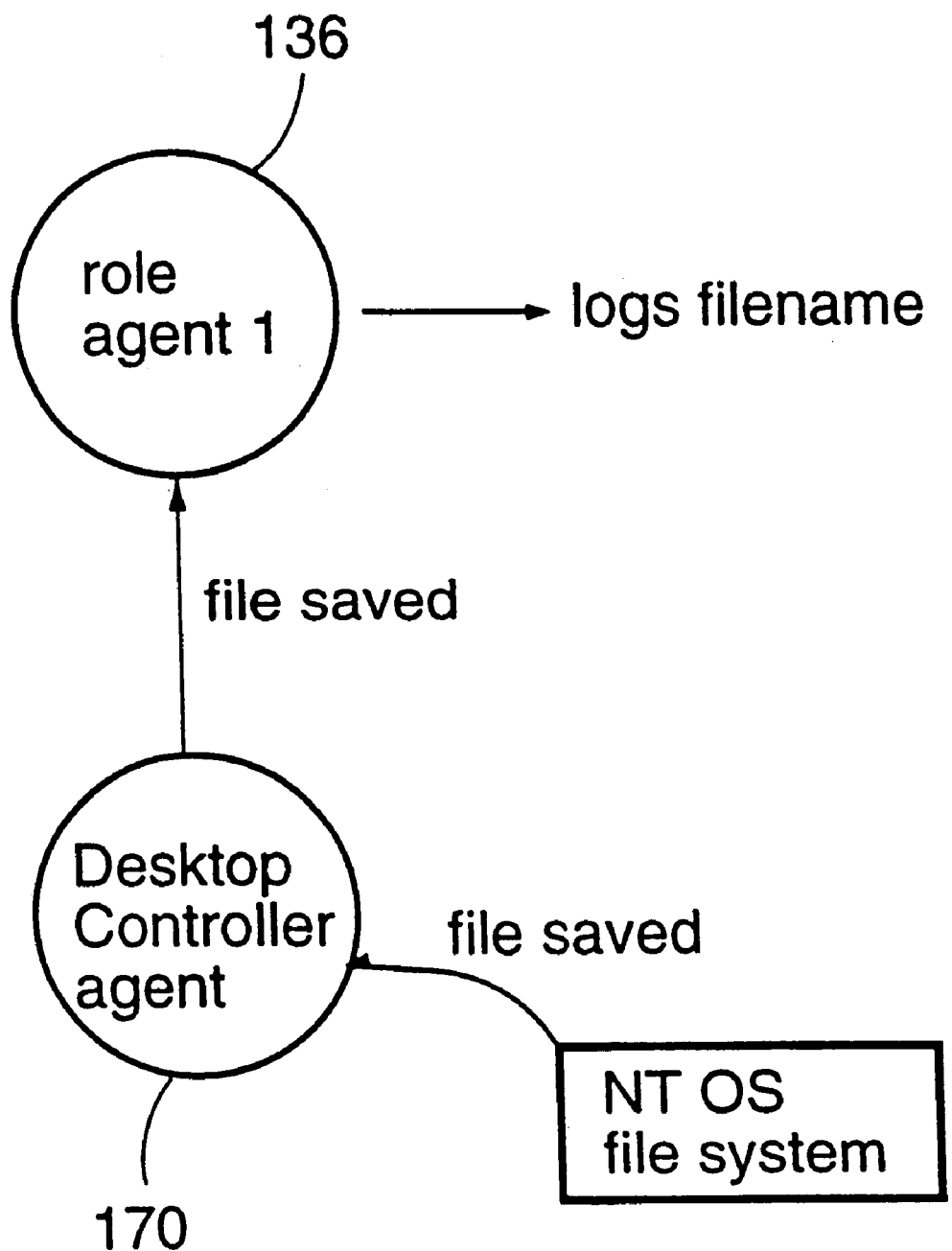

The desktop controller agent 170 also includes an operating system monitor agent 194 to monitor the operating system of the PC 160 and detect when a file is created or executed (i.e. final save). When the operating system monitor agent 194 detects that a file has been created or exited, it sends a message to the desktop controller agent 170 which in turn sends a message to the role agent 136. The role agent 136 executes a script which logs the file information in a communications log as shown in FIG. 8B.

Figure 3A:
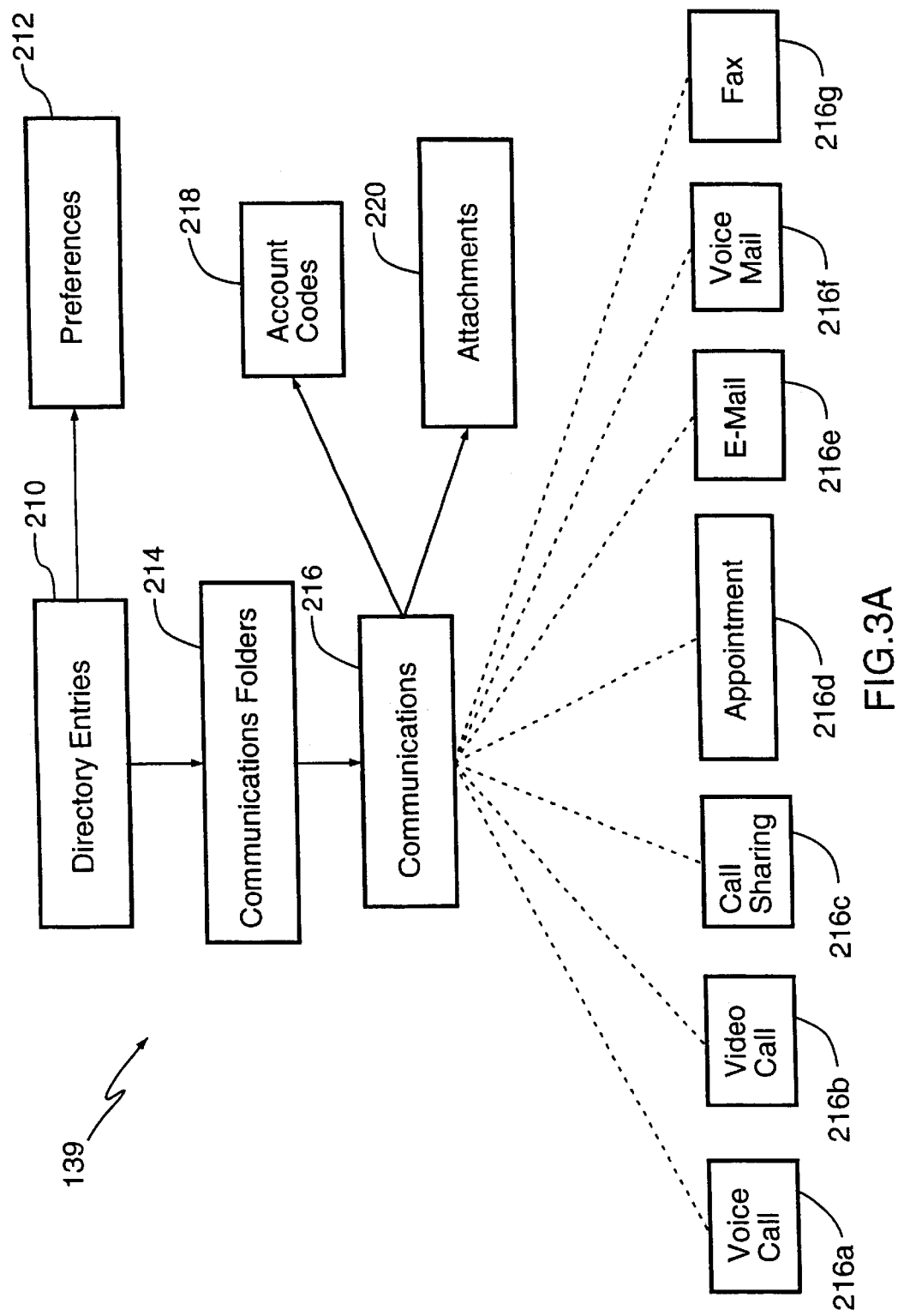
FIGS. 3A and 3B are block diagrams illustrating data associated with a role agent.

FIG. 3A illustrates the structure of the communications information stored at the role agent 136. As can be seen, the role agent 136 keeps a directory 210 in which directory entries are held. The directory entries are business and personal contacts associated with the role of the user logged into the network 116. Preferences 212 associated with each directory entry are also stored by the role agent 136. The preferences are for example types of communications preferred by the business and personal contacts.

Communications folders 214 for the user such as personal and public communications folders are also stored by the role agent 136. The personal communications folder includes a log storing incoming and outgoing communications, deleted communications etc. The communications 216 in the logs of each communications folder 214 may be of virtually any type such as for example voice calls 216a, video calls 216b, call sharing 216c, appointments 216d, e-mail 216e, voice mail 216f, facsimiles 216g etc. Each communication 216 in each communications folder 214 may be associated with an account code 218 for billing and contract purposes and may also have one or more attachments 220.

Figure 3B:
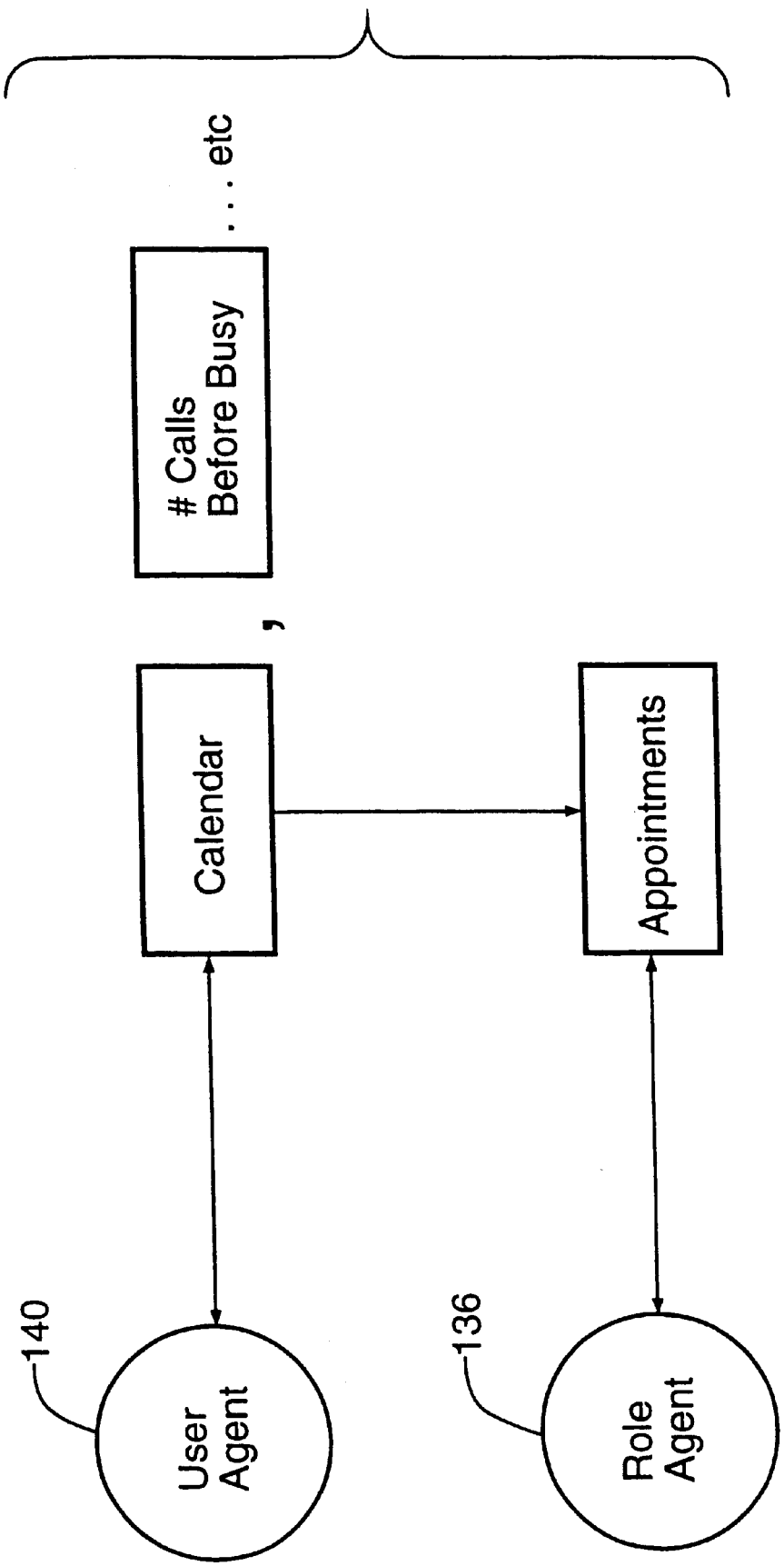

Turning to FIG. 3B, the structure of the communications information stored in database 141 at the user agent 140 is better illustrated. As can be seen, the communications information is user specific since a user can only be in one place at one time. Thus, the user agent 140 resolves conflicts between roles. In this example, the communications information includes a calendar, the number of calls before busy regardless of the role receiving the call etc.

Referring now to FIG. 4, the incoming and outgoing communications in the log of personal communications folder 214 is better illustrated. As can be seen, the log is in a list format and includes all of the incoming and outgoing communications related to the user. The log indicates the type of communication, the time the communication was sent or received, the date on which the communication was sent or received, the direction of the communication (i.e. whether it is incoming or outgoing), the author of the communication, the receiver of the communication and the duration of the communication. If desired, additional fields can be provided in the log such as for example account codes associated with each communication, the subject of the communication etc. Links can be established between the entries in the log and files created by the user associated with the entries. In this manner, if the entry in the log is selected, the associated file entries that are linked to the selected entry are displayed. Software is provided in the role agent 136 to allow the entries in the log to be sorted by any combination of fields and presented either in the list format as shown or in a calendar format. FIG. 9 shows pseudo code for producing a monthly report or summary from entries in the log.

The PC 160 contains a telephone applications program of the type disclosed in U.S. Pat. No. 5,533,110 to Pinard et al., and assigned to Mitel Corporation, assignee of the present application, the content of which is also incorporated herein by reference. The user interface agent 180 executes the telephone applications program to control views, windows or icons 190 appearing on the monitor 160a of the personal computer 160 to allow communications to be created, received, read and/or manipulated.

The views include a main window presenting a display showing communications information. The views also include a communications folder view, a directory view, a local caller icon, a call setup window and a call window. The communications folder view allows the logs of each communications folder 214 to be displayed.

The local caller icon represents the user logged into the network 116 via the PC 160. The call setup icon is used when the user wishes to send a communication to a called party. In this case, the user drags the local caller icon into the call setup window resulting in the directory 210 being displayed in the directory view. The user can then drag a directory entry from the directory 210 into the call setup window at which time a communications link is initiated to the party to be called. When the communications link is established, the call window is displayed showing the local caller icon and a called party icon. If an attachment is to be sent to the called party, an attachment icon representing the attachment to be sent is dragged into the call window. The above windows and icons and their operation relating to telephone communications are described in U.S. Pat. No. 5,533,110 to Pinard et al. referred to above.

Within the server 120 are desktop controller agents 250 for each stand alone telephone 126. The desktop controller agents 250 have jurisdiction over and are responsible for creating and initializing a dial tone generator agent 252, a dialing signal detector agent 254, a phone agent 256, a connection agent 258 and a user interface agent 260. The dial tone generator agent 252 is responsible for connecting a dial tone generator 262 to the stand alone telephone 126 when an off-hook or hands-free dialing condition is detected by way of the phone agent 256 and a phone driver 268. The dialing signal detector agent 254 is responsible for storing dialing signals generated by the stand alone telephone 126 that have been translated by a dialing signal translator 264. The connection agent 258 is responsible for controlling a connection control resource 266 to interconnect the stand alone telephone 126 and data switch 118 when a telephone call is to be made or received. The user interface agent 260 maintains a communications folder 270 in which all communications activities are stored as described above. If the role of the user using the stand alone telephone 126 requires the user to have access to e-mail, facsimile messages etc., the desktop controller agent 250 has jurisdiction over and is responsible for text-to-voice and voice-to-text converters to allow the user to retrieve and send these types of communications.

Figure 5:
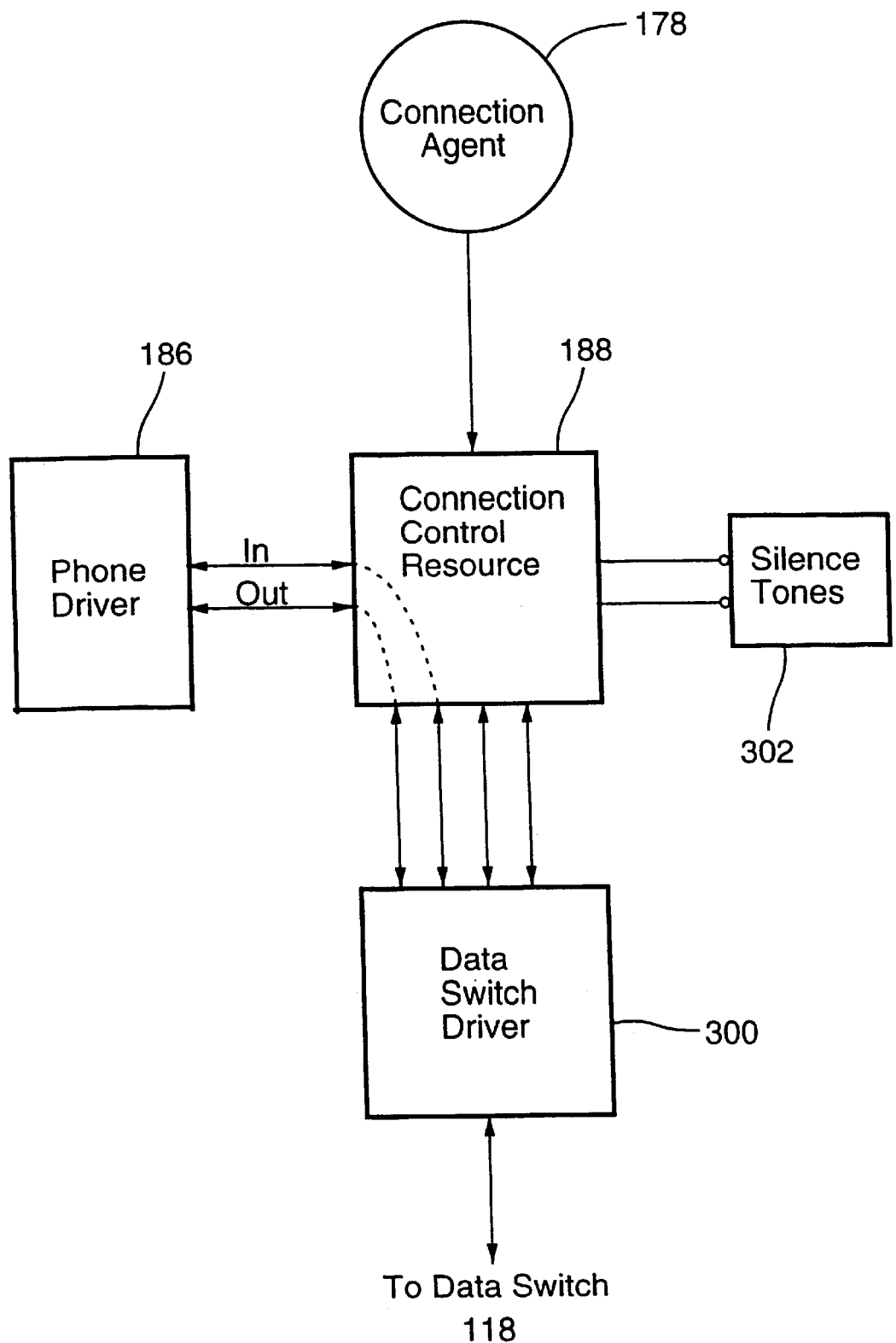
FIG. 5 is a schematic diagram illustrating a connection agent and a connection control resource forming part of the processor system of FIGS. 2A and 2B.

Referring now to FIG. 5, the connection agent 178 and connection control resource 188 are better illustrated. As can be seen, the connection control resource 188 is responsive to the connection agent 178 and selects virtual channels to interconnect a data switch driver 300 leading to data switch 118 and the phone driver 186 connected to the telephone 162. The connection control resource 188 also performs mixing between virtual channels to allow for conference calls, call swapping and connects the outgoing virtual channels to silence 302 if a party is to be placed on hold as well as retrieves calls placed on hold. As will be appreciated, the connection control resource 188 handles connection control between the telephone 162 and the data switch 118 locally.

As such, the connection control resource 188 is able to change the connection of the telephone to different virtual channels allowing the telephone connection to be moved back and forth between the virtual channels. Since the switching is done locally, the connection control resource 188 does not interfere with another party's connections and thereby avoids glare situations.

Figure 6:
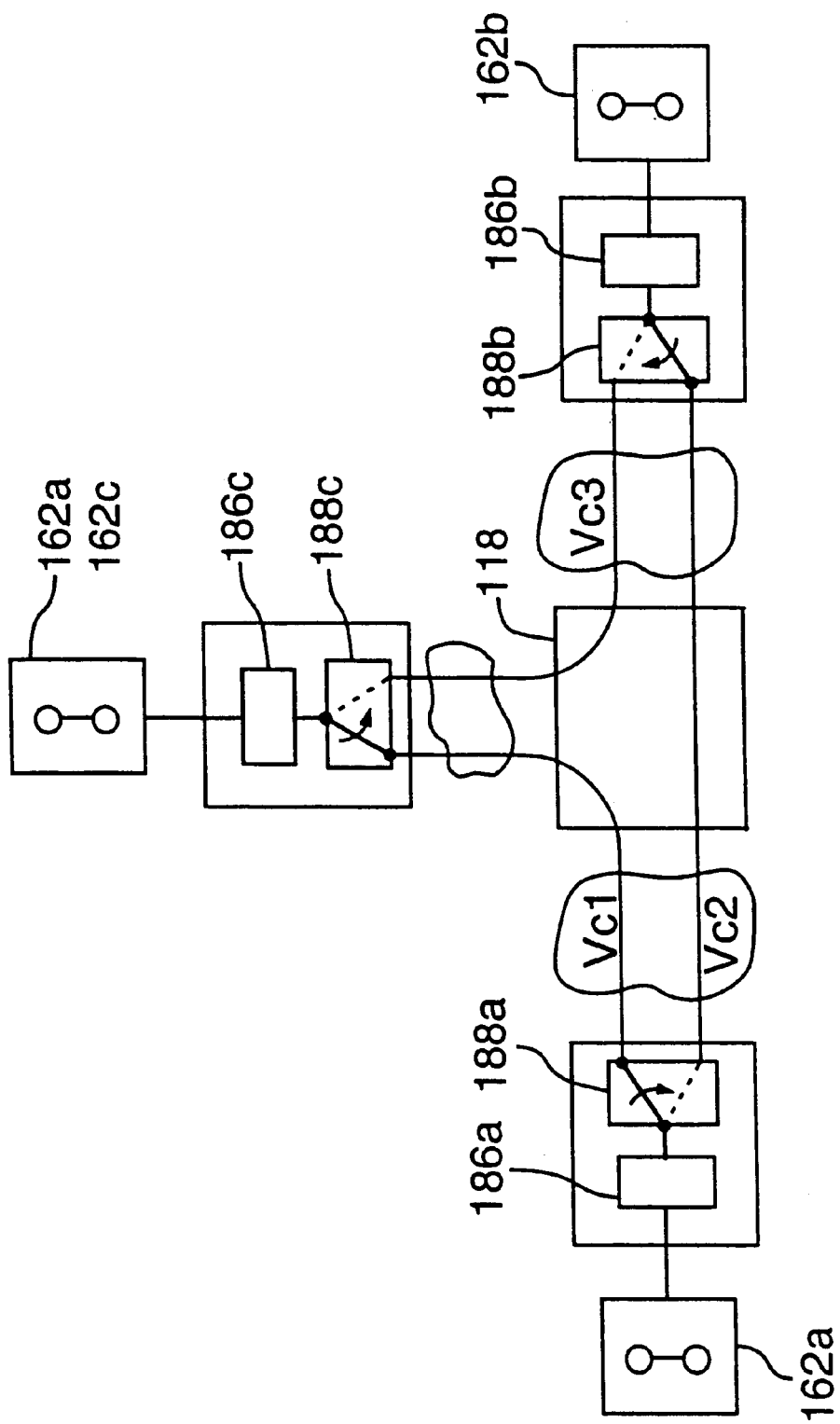
FIG. 6 is a schematic diagram illustrating connection control between multiple telephones forming part of the communications system of FIG. 1.

For example, FIG. 6 shows three USB telephones 162a, 162b, 162c connected to one another across virtual channels vc1, vc2 and vc3 respectively. The virtual channels may extend over a public switched telephone network (PSTN), a wide area network (WAN), an internet connection or an intranet connection As can be seen, telephone 162a is connected to telephone 162b via virtual channel vc2. Telephone 162a is connected to telephone 162c via virtual channel vc1 while telephone 162c is connected to telephone 162b via virtual channel vc3. Connection control resource 188a is responsive to its associated connection agent to move the telephone connection between the virtual channels vc1 and vc2 placing one of the telephone calls on hold. Likewise, connection control resource 188b is responsive to its associated connection agent to move the telephone connection between the virtual channels vc1 and vc3 while connection control resource 188c is responsive to its associated connection agent to move the telephone connection between the virtual channels vc2 and vc3. As will be appreciated, the connection control agents 178 control the local connection control resource unlike "centralized switching" type connections which require a party that is to be placed on hold, to be connected to silence by a remote data switch. If the party placed on hold is manipulating the channels to which it is connected, glare situations can occur resulting in the loss of communications across the channels. In the present system, glare situations of this nature are avoided.

In general, if a user wishes to make a telephone call and the handset of the telephone 162 is removed from its cradle or if hands-free dialing is selected, the phone agent 176 monitoring the subscriber's line current detects the increase in line current. The phone agent 176 sends a message to the desktop controller agent 170 which in turn sends a message to the dial tone generator agent 172 causing it to connect the dial tone generator 182 to the telephone 162 and thereby provide the dial tone. Once the dial tone is provided and the user begins dialing digits, the dialing signal translator 184 detects and translates the DTMF dialing signals. As dialing signals are translated, they are stored by the dialing signal detector agent 174. The stored dialed digits are conveyed by the dialing signal detector agent 174 to the desktop controller agent 170 which in turn conditions the user interface agent 180 to open a window. The dialed party is displayed in the window.

Of course, the user can also make a telephone call by selecting the local caller icon and dragging it into the call setup window to display the directory 210. Once the directory is displayed, the desired directory entry can be selected and dragged into the call setup window thereby to display the call window showing the local caller icon and the called party icon.

Once a telephone call has been initiated in one of the above-described manners, the desktop controller agent 170 sends a message to the user agent 140 which in turn sends it to the role agent 136. The message contains the virtual channel that the connection agent 178 selected for the call. The desktop controller agent 170 in turn sends a message to the connection agent 178 causing the connection agent to condition the connection control resource 188 to connect the phone driver 186 to the appropriate virtual channel so that the telephone call can be made.

When the role agent receives a request to call another party, the role agent looks up the "address" of the role agent assigned to the party to be called and sends a message offering the call to that role agent 136. The role agent receiving the message in turn sends the message to the called party's user agent 140 which sends it to the desktop controller agent 170. The desktop controller agent then uses the connection agent 178 to get a virtual channel which will map to the calling party. The desktop controller agent 170 also notifies the phone and user interface agents that the call is being offered. This causes the phone to ring and the call offered to be displayed on the personal computer 160. If the called party answers the call either by going off-hook, "clicking" on the personal computer or "dragging" the appropriate icon, then the desktop controller agent 170 is informed. The desktop controller agent 170 in turn notifies the connection agent 178 which connects the handset and also notifies the user agent 140 which passes the message through to the role agent 136. The role agent 136 in turn sends the message to the role agent assigned to the calling party allowing a connection between the parties to be made. The communications path is thus established.

If the user selects an attachment such as an e-mail message, a facsimile message etc. to accompany the telephone communication, the desktop controller agent 170 invokes an appropriate agent to transmit the attachment to the called party. The attachment is of course transmitted in a suitable form to allow the called party to discern it from voice call signaling. The telephone applications software executed by the user interface agent 180 includes a protocol to identify a communication as an attachment to another communication and the applications software links them within the system. If an attachment cannot be received by the called party, it is discarded. The protocol in turn generates an error message for display to the caller.

Figure 7A:
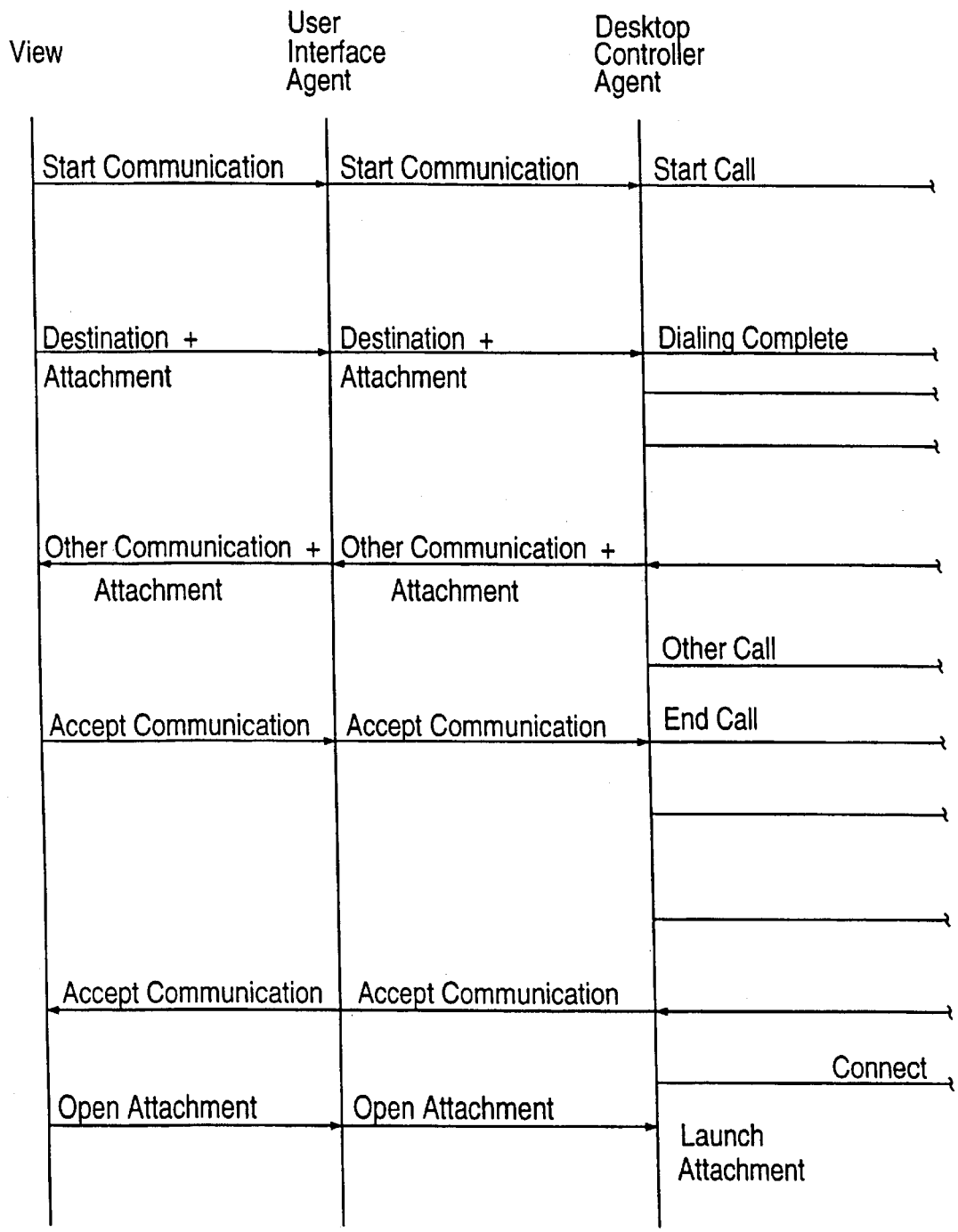
FIGS. 7A and 7B illustrate message flow during telephone communications over the communications system of FIG. 1 between user agents.
Figure 7B:
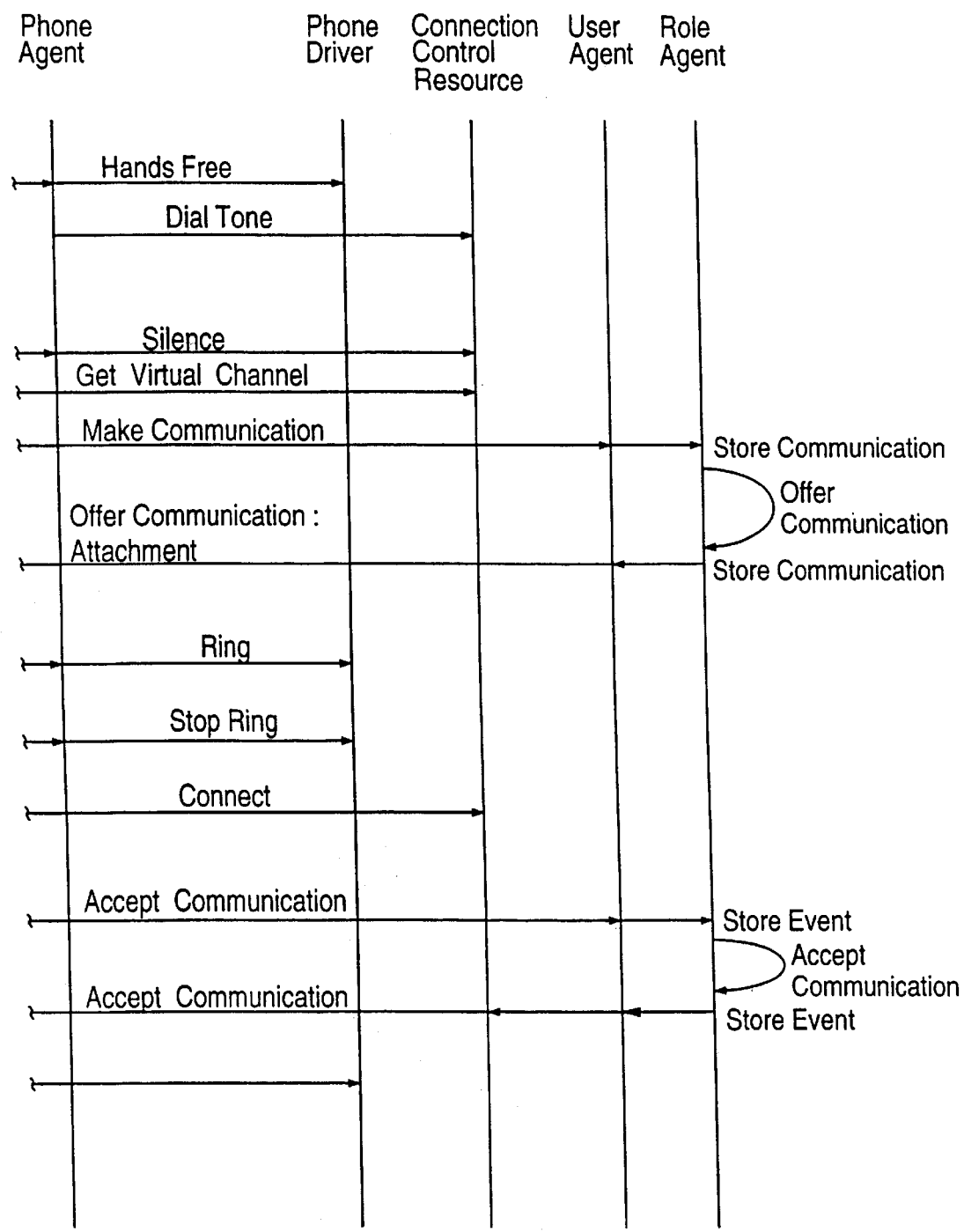

FIGS. 7A and 7B show the message trace between two callers establishing a hands-free telephone communications link with the calling user selecting an attachment (in this example e-mail) to accompany the telephone communication. As can be seen, the caller opens a window showing the directory including the party to whom the telephone call is to be made. The caller then selects the party to be called and selects the attachment to accompany the telephone call (i.e. the e-mail). Once the party and attachment have been selected, the user drags the party and attachment into the call setup window.

When this occurs the user interface agent 180 sends a message to the desktop controller agent 170 which in turn causes the dial tone generator agent 172 to connect the dial tone generator 182 to the telephone to supply the dial tone as described previously. Once the dial tone is provided, the selected party is dialed. The dialed digits are translated by the dialing signal translator 184 and stored by the dialing signal detector agent 174. The desktop controller agent 170 sends a message to the connection agent 178 so that the connection agent conditions the connection control resource 188 to connect the telephone to the appropriate virtual channel of the network 116.

Once the connection has been made, the desktop controller agent 170 sends a message to the role agent 136 through the user agent 140 including the communication and attachment. When the role agent receives the communication and the attachment, it stores the communications and attachment and then executes a script to create an entry for the communications log with the appropriate fields of the entry filled in (see FIG. 8A). Once the entry has been completed the role agent 136 stores it in the log of the appropriate communications folder 214. Following this, the role agent 136 offers the communication to the called party over the network 116.

The role agent at the called party firstly determines whether the call is to be blocked or forwarded pursuant to the preferences stored in the role agent database 139. If the call is to be blocked a busy message is sent to the role agent of the caller. If the call is to be passed through to the called party, the role agent associated with the called party receives the communication and attachment from the caller and then offers the communication and attachment to the desktop controller agent 170 through the user agent 140. When the role agent of the called party receives the communication and the attachment, the role agent also executes a script which creates an entry for the log of the appropriate communications folder with all of the appropriate fields filled in. Once the entry has been completed, the role agent 136 stores the entry in the log.

Upon being offered the communication and attachment, the desktop controller agent 170 sends a message to the user interface agent causing the user interface agent 180 to open a window to display the caller's identification and the attachment. Since the offered communication is in the form of a telephone call, the desktop controller agent 170 also sends a message to the phone agent 176 which in turn causes the phone driver 186 to ring the telephone. When the called party accepts the communication from the window, it is detected by the user interface agent 180 which in turn sends a message to the desktop controller agent 170. The desktop controller agent in turn sends a message to the phone agent 176 causing the phone driver 186 to stop ringing the telephone. At the same time, the desktop controller agent 170 sends a message to the connection agent 178 which in turn causes the connection control resource 188 to connect the telephone to the appropriate virtual channel of the network 116.

Once the communications link has been established, the desktop controller agent 170 sends a message to the user interface agent 180 causing it to open a call window showing the local caller icon and a calling party icon signifying that the communication has been accepted. The open window also shows the attachment. When the user selects the attachment, it is detected by the user interface agent 180 which in turn sends a message to the desktop controller agent 170 causing the desktop controller agent to send a message to the appropriate resource to launch the attachment.

As will be appreciated, the present communication system allows attachments to be sent with virtually any form of communications. A log of all communications made and received from each user is kept allowing detailed activity reports to be generated. Since links can be made between communication entries in the log and created files, files can be located and retrieved using the communications log entries. In addition, since the connections between telephones and the network are locally controlled glare situations are avoided.

Although the agent architecture has been described as being based on the architecture described in U.S. Pat. No. 5,638,494, those of skill in the art will appreciate that alternative agent architectures can be used. For example, the agents may be constituted by programs which when executed perform the tasks described previously. The agents may also represent objects in terms of object-oriented languages such as for example $C^{++}$, Java, SmallTalk and the like.

Although a particular embodiment of the present invention has been described, those of skill in the art will appreciate that other variations and modifications may be made without departing from the spirit and scope thereof as defined by the appended claims.

We claim:

1. A method of operating a communications system comprising the steps of:
   providing a user agent for each user of said communications system, each user agent having at least one role;
   creating a desktop controller agent for a user when said user access said communications system, said desktop controller agent selecting resources necessary for said desktop controller agent to provide the user agent associated with said user, with communications facilities said user agent requires to perform said at least one role, said desktop controller agent receiving communication goal commands (goals) from said associated user agent and invoking processes to achieve said communication goals, said communication goals instructing the handling of different types of communications;
   creating resource agents for the selected resources, each in communication with an associated device, each resource agent storing communication goals received from said associated desktop controller agent and operating said associated device in response to said communication goals thereby to achieve said communication goals;
   interconnecting all of said agents and carrying communication goals between said agents;
   maintaining at least one communications folder for each of said user agents, each communications folder including a log of communications carried out in response to communication goals generated by said associated user agent; and
   selectively including attachments to accompany outgoing communications carried out in response to said communications goals.

2. The method of claim 1 wherein a communications folder is maintained for each role performed by said associated user agent.

3. The method of claim 2 wherein said different types of communications include two or more of voice calls, video calls, appointments, shared data calls, emails, voice mails and facsimile messages.

4. The method of claim 3 wherein each desktop controller agent has jurisdiction over a user interface agent, logs of communications being accessed via said user interface agent.

5. The method of claim 4 wherein said user interface agent is resident on a computer and displays said logs of communications on a monitor of said computer.

6. The method of claim 5 wherein said attachments are selected using said computer.

7. The method of claim 6 wherein said different types of communications are associated with account codes.

8. The method of claim 6 wherein the resource agents created for the selected resources include a dial tone generator agent, a connection agent and a phone agent, said dial tone generator agent operating a dial tone generator, said dialing signal detector agent operating a dialing signal translator, said connection agent operating a connection control resource and said phone agent operating a phone driver coupled to a telephone device, said communications goals including goals including signals defining the operation of tasks in processing a telephone call between agents.

9. The method of claim 3 wherein said role agents store said communications folders, said role agents creating entries for the logs of communications as communications are carried out in response to said communication goals.

10. The method of claim 9 where said role agents execute scripts to create log entries.

11. The method of claim 10 wherein said role agents sort said log entries and generate reports.

12. The method of claim 11 wherein said role agents are responsive to said user agents and configure said logs of communications to display entries in list or calendar formats.

13. The method of claim 9 wherein said desktop controller agents create operating system monitor agents to monitor operating systems of computers, the role agents being responsive to the desktop controller agents to create logs of created files, said role agents allowing file entries to be linked to entries in logs of communications.

14. A communications system comprising:
   a user agent for each user of said communication system, each user agent having at least one role;
   a desktop controller agent for each user accessing said communication system, said desktop controller agent selecting recourses necessary for said desktop controller agent to provide the user agent associated with said user, with the communications facilities said user agent requires to perform said at least one role, said desk top controller agent receiving communication goal commands (goals) and invoking processes to achieve said communication goals, said communications goals including the handling of different types of communications;
   resource agents for the selected resources, each in communication with an associated device, each resource agent storing communication goals received from said associated desktop controller agent and operating said associated device in response to said communication goals thereby to achieve said communication goals;
   a network interconnecting all of said agents and carrying communication goals between said agents;
   at least one communications folders for each of said user agents, each said communications folder including a log of communications carried out in response to communication goals generated said associated user agent; and
   attachments to accompany outgoing communications carried out in response to said communication goals.

15. A communications system as defined in claim 14 wherein a communications folder is maintained for each role performed by said associated user agent.

16. A communications system as defined in claim 15 wherein said different types of communications include two or more of voice calls, video calls, appointments, shared data calls, emails, voice mails and facsimile messages.

17. A communications system as defined in claim 16 wherein each desktop controller agent has jurisdiction over a user interface agent, said logs of communications being accessed via said user interface agent.

18. A communications system as defined in claim 17 wherein said user interface agent is resident on a computer and displays logs of communications on a monitor of said computer.

19. A communications system as defined in claim 18 wherein said attachments are selected using said computer.

20. A communications system as defined in claim 19 wherein said different types of communications are associated with account codes.

21. A communications system as defined in claim 15 wherein the resource agents created for the selected resources include a dial tone generator agent, a dialing signal detector agent, a connection agent and a phone agent, said dial tone generator agent operating a dial tone generator, said dialing signal detector agent operating a dialing signal translator, said connection agent operating a connection control resource and said phone agent operating a phone driver coupled to a telephone said communication goals including signals defining the operation of tasks in processing a telephone call between agents.

22. A communications system as defined in claim 15 wherein role agents store the one communications folders for the roles performed by said user agent and create entries for the logs of communications as communications are carried out.

23. A communications system as defined in claim 22 wherein said role agents execute scripts to create said log entries.

24. A communications system as defined in claim 23 wherein said role agents sort said logs of communications and generate reports.

25. A communications system as defined in claim 24 wherein said role agents are responsive to said user agents to configure said logs of communications to display entries in list or calendar formats.

26. A communications system as defined in claim 15 wherein said desktop controller agents create operating system monitor agents to monitor operating systems of computers, the role agents being responsive to the desktop controller agents to create logs of created files, said role agents allowing file entries to be linked to entries in logs of communications.

27. A communications system comprising:
a plurality of process agents receiving goal commands (goals) in the form of signals defining tasks to be performed to establish telephone calls;
a plurality of connection agents, each in communication with an associated telephone interface circuit and receiving and storing goals from a process agent and operating said associated telephone interface circuit in response to goals received from a process agent to establish a telephone call from one telephone interface circuit to another; and
a network interconnecting all of said agents and carrying goals between said agents thereby, said connection agents locally controlling connection of said telephone interface circuits to channels of said network, wherein said connection agents are operable to connect said telephone interface circuits to silence locally to place telephone calls on hold in response to on-hold goal commands.

28. A communications system as defined in claim 27 wherein said connection agents are operable to connect said telephone interface circuits to multiple channels to conference telephone calls in response to conference goal commands.

29. A communications system as defined in claim 28 wherein said connection agents are operable to condition said telephone interface circuits to swap connections between channels to swap telephone calls in response to swap goal commands.

30. A communications system as defined in claim 27 wherein said network is at least one of a public switched telephone network, a wide area network, an internet connection and an intranet connection.

31. A method of operating a communications system comprising the steps of:

providing a plurality of process agents receiving goal commands (goals) in the form of signals defining tasks to be performed to establish telephone calls;
providing a plurality of connection agents, each in communication with an associated telephone interface circuit and receiving and storing goals from a process agent and operating said associated telephone interface circuit in response to receiving said goals from a process agent to establish a telephone call from one telephone interface circuit to another;
interconnecting all of said agents and carrying goals between said agents; and
locally controlling connection of said telephone interface circuits to channels of said network via said connection agents, wherein said locally controlling step-, includes connecting said telephone interface circuits to silence too place telephone calls on hold in response to on-hold goal commands.

32. The method of claim 32 further comprising the step of, during said locally controlling step, connecting said telephone interface circuits to multiple channels to conference telephone calls in response to conference goal commands.

33. The method of claim 32 further comprising the step of, during said locally controlling step, conditioning said telephone interface circuits to swap connections between channels to swap telephone calls in response to swap goal commands.

34. A communications system comprising:
a network having a plurality of channels;
a plurality of telephone devices connectable to one or more channels of said network to establish telephone connections between telephone devices; and
switch means acting between each of said telephone devices and said network, each said switch means being locally controlled to connect said associated telephone device to selected channels of said network, wherein each said switch means is actuable to connect said associated telephone device to silence to place a telephone connection on hold.

35. A communications system as defined in claim 34 wherein each switch means is actuable to connect said associated telephone device to multiple channels of said network to conference telephone connections.

36. A communications system as defined in claim 35 wherein each switch means is actuable to swap connections between channels of said network to swap telephone connections.

37. A communications system as defined in claim 34 wherein said network is at least one of a public switched telephone network, a wide area network, an internet connection and an intranet connection.

38. A method of operating a communications system comprising the steps of:
providing a user agent for each user of said communications system, each user agent having at least one role;
creating a desktop controller agent for a user when said user accesses said communications system, said desktop controller agent selecting resources necessary for said desktop controller agent to provide the user agent associated with said user, with communications facilities said user agent requires to perform said at least one role, said desktop controller agent receiving communication goal commands (goals) from said associated user agent and invoking processes to achieve said communication goals, said associated user agent and invoking processes to achieve said communication goals, said communication goals instructing the handling of different types of communications;

creating resource agents for the selected resources, each in communication with an associated device, each resource agent storing communication goals received from said associated desktop controller agent and operating said associated device in response to said communication goals thereby to achieve said communication goals;

interconnecting all of said agents and carrying communication goals between said agents;

maintaining at least one communications folder for each of said user agents, each communications folder including a log of communications carried out in response to communication goals generated by said associated user agent; and selectively executing routines to sort entries in each said log of communications thereby to generate reports.

39. The method of claim 38 further including the step of configuring said logs of communications to display entries in list or calendar formats.

40. A communications system comprising:

a user agent for each user of said communication system, each user agent having at least one role;

a desktop controller agent for each user accessing said communication system, said desktop controller agent selecting resources necessary for said desktop controller agent to provide the user agent associated with said user, with the communications facilities said user agent requires to perform said at least one role, said desktop controller agent receiving communication goal commands (goals) and invoking processes to achieve said communication goals, said communication goals including the handling of different types of communications;

of resource agents for the selected resources, each in communication with an associated device, each resource agent storing communication goals received from said associated desktop controller agent and operating said associated device in response to said communication goals thereby to achieve said communication goals;

a network interconnecting all of said agents and carrying communication goals between said agents;

at least one communications folders for each of said user agents, each said communications folder including a log of communications carried out in response to communication goals generated by said associated user agent; and selectable executable routines to sort entries in each said log of communications thereby to generate reports.

41. A communications system as defined in claim 40 wherein routines are selected and executed to configure said logs of communications to display entries in list or calendar formats.

42. The method of claim 1 further comprising the step of selectively executing routines to sort entries in said logs of communications thereby to generate reports.

43. A communications system according to claim 14 further including selectable executable routines to sort entries in said logs of communications thereby to generate reports.

\* \* \* \* \*